METHOD OF FORMING A TRANSISTOR AND VARISTOR BY REDUCTION AND DIFFUSION

Filed March 13, 1963

INVENTOR.
ALFRED S. KHOURI
BY [signature]
ATTORNEY

United States Patent Office 3,351,500
Patented Nov. 7, 1967

3,351,500

METHOD OF FORMING A TRANSISTOR AND VARISTOR BY REDUCTION AND DIFFUSION

Alfred S. Khouri, Milwaukee, Wis., assignor to Globe-Union Inc., Milwaukee, Wis., a corporation of Delaware Filed Mar. 13, 1963, Ser. No. 264,960
18 Claims. (Cl. 148—1.5)

This invention relates to non-linear asymmetrical and symmetrical electrical devices made on semiconductor materials such as polycrystalline, alkaline earth, titanate ceramic compositions and to their method of manufacture.

In their original sintered condition, these ceramic dielectric materials are stoichiometric and non-conductive having a volume resistively in the order of $10^{12}$ ohm./cm. These high dielectric constant ceramic dielectrics can be made into non-stoichiometric, N-type, semiconductor material by methods such as reduction in a hydrogen or carbon monoxide atmosphere at temperature in the range of 2000 to 2500 degrees F. The inclusion of rare earth materials or columbium into these well-known ceramic compositions enables N-type semiconductor bodies to be made by the reduction process which have electron donor ionic concentration, N, in the same order or magnitude as silicon.

An object of this invention is to provide an alternating current rectifier made on reduced titanate ceramic having a high rectification efficiency and also exhibiting a large auxiliary capacitance.

Another object of this invention is to provide a means of constructing the N-type ceramic semiconductor to enable rectifiers and rectifier devices to be operable at higher voltages.

In the construction of a rectifier on a semiconductor material one electrode must be formed to act as the donor rectifying contact electrode and the other to work as the acceptor rectifying contact electrode. Customarily the donor contact electrode has been applied by spraying, evaporating or painting metallic electrodes on the titanate N-type ceramic substrate. The acceptor electrode contacts have been made by electrolytically depositing contacts of lead or manganese dioxides over a section of the substrates surface which has been thermally oxidized. It has been discovered that a diffused donor junction rectifying contact can be made having a higher rectification efficiency made by the application of a paint compound containing approximately 4 parts of silver oxide, $Ag_2O$, and 1 part of a donor impurity doping chemical, such as columbium pentoxide, $Cb_2O_5$, to the junction in a resinous vehicle. On the firing of this electrode paint at 1700 degrees F. for approximately 15 minutes, the silver oxide is reduced to a molecular film of silver making ohmic contact with the layer of substrate underneath, which layer is characterized by having its ionic electron density, N, increased. It appears that this has been effected by a diffusion and doping effect caused by the acceptance of the columbium ion in the ceramic lattice crystal structure. Although the efficiency of a rectifier constructed with this type of donor junction is high, its effectiveness can be increased by a seeming paradox. The inclusion of a small amount of a positive, or acceptor doping impurity such as boron phosphate, $BPO_4$, provides an activation of the basic columbium pentoxide donor doping impurity to provide a substantially increased rectification efficiency. This activation can be best explained as an "Association Complex" in which the donor ion is paired with an acceptor ion in the ceramic lattice structure, enabling the number of available electrons participating in the semiconductor N factor to be substantially increased.

Accordingly a further object of this invention is the provision of an improved donor diffused junction.

It has also been discovered that a more efficient acceptor rectifying contact can be made by the forming of a metallic electrode in ohmic contact over a junction area that has been diffused and doped with the proper acceptor impurity doping agent. For example, bismuth can be added by a substitution in the polycrystalline ceramic lattice structure through oxidation of the reduced substrate with bismuth trioxide, $Bi_2O_3$. In addition a small quantity of boron silicate is added to accomplish two functions. Upon firing of the electrode paint at a temperature of 1400 to 1600 degrees F. it amalgamates with the polycrystalline, alkaline earth reduced titanate ceramic and apparently diffuses and provides additional acceptor doping by substitution of the boron ion in the ceramic lattice structure. The boron silicate also serves to bind the finely divided silver particles carried in the paint mixture in intimate ohmic contact with the acceptor doped area of the substrate The combined acceptor impurity doping actions effected by the acceptance of the bismuth and boron ions in the reduced titanate ceramic under the conducting electrode junction of metallic silver creates an efficient diffused junction acceptor rectifying terminal and a further object of this invention is the provision of such an improved acceptor junction.

A rectifier constructed with the diffused junction acceptor and donor rectifying terminals described above will have a rectification ratio of approximately 10,000. In addition to this efficient rectification, it displays a desirable capacitance effect of approximately 0.1 $\mu$f. per cm.$^2$.

This invention also contemplates the provision of a procedure for making rectifiers constructed on reduced titanate semiconductor ceramic and also junction capacitor, varistor combinations made as an integral "back to back" rectifier pair operable at higher voltages. The capacitor, varistor element has been described in U.S. Patent No. 2,841,508 issued to Rolland R. Roup and Jack S. Kilby and assigned to the assignee of this application. This construction lends itself to low voltage operation. It has been determined that a partial oxidation of the reduced titanate semiconductor substrate effects an increase in the volume resistivity of the material and it was found that this can be accomplished with sodium hydroxide, NaOH, and/or bismuth trioxide, $Bi_2O_3$. For example, various degrees of oxidation and consequent increase in volume resistivity can be obtained by soaking the substrate in a mixture of 10 grams of $Bi_2O_3$, 5 grams of NaOH and 100 grams of water and subsequently removing and firing the substrate at an elevated temperature for a short period of time. This procedure can be programed to increase the volume resistivity of the reduced titanate ceramic substrate from 10 ohms/cm. to over 100,000 ohm/cm. It is of particular value in increasing the volume resistivity of the semiconductor substrate between the junction terminals of the rectifier and rectifier circuit combinations enabling them to operate at higher voltages with low leakage current.

Other objects and advantages will be pointed out in, or be apparent from, the description and claims, as will obvious modifications of the embodiments shown in the drawing, in which:

Figure 1:
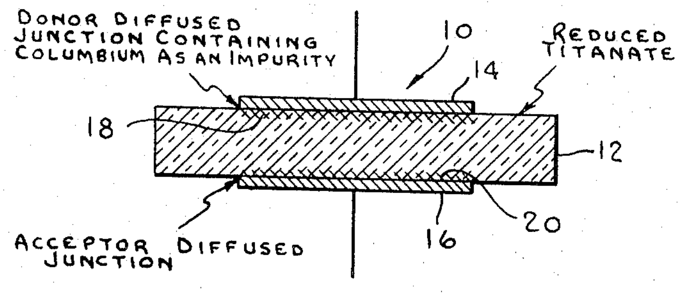
FIG. 1 is a generally schematic illustration of a rectifier.

The invention will now be described in detail and with particular reference to the drawing. A rectifier 10 includes a substrate 12 having electrodes 14 and 16 formed thereon, preferably a barium titanate ($BaTiO_3$) substrate reduced in a suitable manner is used. In accordance with this invention a donor diffused junction is provided at electrode 14 by utilizing a quantity of columbium pentoxide ($Cb_2O_5$) as an impurity doping agent in the formation of the junction. A compound comprising approximately four parts silver oxide ($Ag_2O$) and one part $Cb_2O_5$ (as the donor doping impurity) is applied to the substrate in the form of an electrode paint. Upon firing, e.g. at approximately 1700° F. and for 15 minutes, the silver oxide is reduced to a molecular film of silver in ohmic contact with the layer of the substrate underneath the electrode and the columbium ion is diffused into the ceramic lattice crystal structure of the substrate below the electrode to increase the electron donor density. This layer of increased electron donor density is schematically illustrated as area 18 in FIG. 1.

The rectification efficiency of a donor diffused junction utilizing $Cb_2O_5$ as the sole donor doping impurity is satisfactory, but it has been observed that, by a seeming paradox, rectification efficiency can be further increased by the inclusion of a small quantity of a mildly positive acceptor doping agent such as boron phosphate ($BPO_4$) which activates the basic $Cb_2O_5$. Preferably, a paint comprising 1 part $Cb_2O_5$, 1 part $BPO_4$, and 3 parts $Ag_2O$ by weight is utilized. It appears that the $BPO_4$ renders the donor diffused junction more negative than would be the case with $C_{b2}O_5$ alone and that this is due to activation of the basic columbium impurity which it is believed can best be explained as an "Association Complex" in which the donor ion is paired with an acceptor ion in the ceramic lattice structure to enable the number of free electrons participating in and contributing to the semiconductor N factor to be substantially increased.

Figure 2:
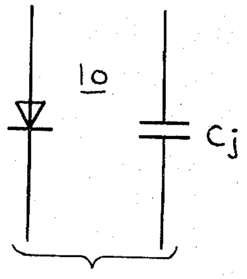
FIG. 2 is an illustrative circuit diagram of the rectifier of FIG. 1.

With an acceptor diffused junction provided at electrode 16 a particularly efficient rectifier 10 is formed. This rectifier, when subjected to a reverse potential, such as the reverse portion of an AC cycle, displays a junction capacitance effect $C_j$, see FIG. 2. The junction capacitance can be expressed by formulae:

$$C_j=N^2K^2$$

wherein N is the electron donor density and K is the permitivity of the semiconductor material. Reduced titanate N-type semiconductor ceramics have a donor electron density in the same order of magnitude as germanium, however, their permitivity is approximately 6000 times as great. Thus with donor and acceptor junction rectifier electrodes formed in accordance with this invention a very efficient rectifier is provided which also exhibits a large value junction capacitance.

It is also proposed to render such rectifiers operable at higher voltages by pre-oxidizing the reduced titanate substrate to achieve a partially oxidized substrate upon which donor and acceptor diffused junctions can be formed. Pre-oxidation is preferably accomplished by soaking the ceramic substrate in a mixture comprising sodium hydroxide (NaOH) or bismuth trioxide ($Bi_2O_3$) carried in a suitable vehicle such as turpentine or water. After a length of time sufficient to allow the viscous mixture to permeate the surface of the substrate to the extent desired, the substrate is removed, drained and fired at a suitable temperature. More particularly, a mixture of 10 grams of NaOH, or $Bi_2O_3$, in 100 cc. of a light resinous vehicle and firing at approximately 1600° F. and for ½ to 2 hours has given satisfactory results. It should be noted that the best results have been observed utilizing NaOH or a mixture of NaOH and $Bi_2O_3$.

The donor diffused junction described above is formed on the partially oxidized ceramic substrate together with an acceptor diffused junction to provide a rectifier operable at higher voltages and thereby having an increased scope of application. It has been observed that a more efficient acceptor rectifying contact 16 is made on the partially oxidized substrate by forming a metallic contact electrode in ohmic contact with a junction area 20 that has been doped by a substitution in the ceramic crystalline structure of the bismuth ion as a result of the partial oxidation described above. More particularly, a paint formulation comprising 1 part $Bi_2O_3$ and 3 parts finely divided silver by weight is used to form electrode 16. When this paint is fired the $Bi_2O_3$ diffuses into the junction area 20 to produce a more efficient acceptor. As will be more fully discussed hereinafter, the $Bi_2O_3$ contributes to the partial oxidation of the substrate and in addition acts as an acceptor doping impurity agent to enhance operation of the circuit element.

If desired, the performance of the acceptor diffused junction can be further enhanced by including in the paint, which already includes finely divided silver and $Bi_2O_3$, a small quantity of boron silicate alkaline glass frit. Upon firing this paint at a suitable temperature, e.g. 1700° for ¼ to 2 hours, the boron silicate glass frit accomplishes two functions, first it amalgamates with the polycrystalline, alkaline earth, titanate and diffuses to provide an additional acceptor doping agent through substitution of the boron ion in the titanate polycrystalline lattice structure; secondly, the boron silicate serves to bind the finely divided silver particles in intimate ohmic contact with the acceptor doped area of the substrate. This doping effect of the bismuth and boron ions under the conducting layer of silver metallic film creates an efficient diffused acceptor junction electrode having a very "abrupt" junction and provides a rectifying contact of exceptionally high efficiency.

Figure 3:
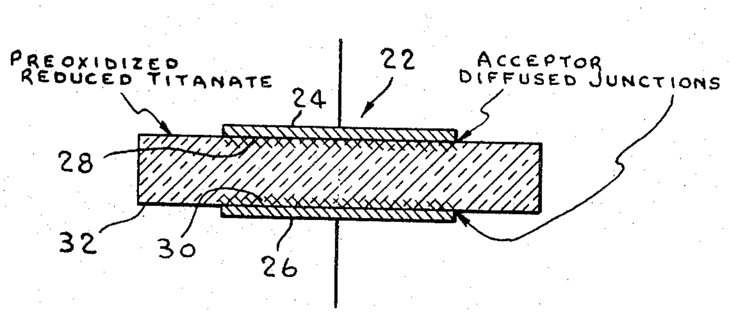
FIG. 3 is a generally schematic illustration of an alternative electrical circuit element.
Figure 4:
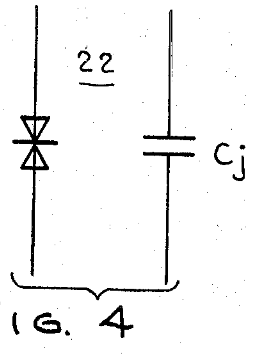
FIG. 4 is an illustrative circuit diagram of the circuit element of FIG. 3.
Figure 5:
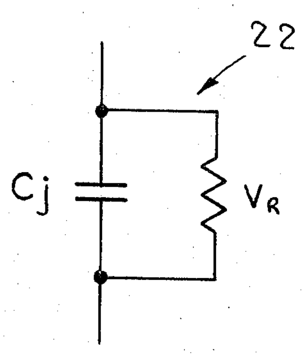
FIG. 5 is a circuit diagram of the element of FIG. 3 further illustrating its effective electrical circuit.

The partially oxidized reduced titanate substrate is applicable to other types of circuit elements, for example a circuit element 22 as is illustrated in FIG. 3. Acceptor electrodes 24 and 26 are formed as described above to provide acceptor diffused junction areas 28 and 30 in a partially oxidized substrate 32. Substrate 32 provides a common shared donor junction for the acceptor junctions and the circuit can be considered as a pair of back-to-back rectifiers with substrate 32 providing a common shared donor junction, but which operates in the nature of a high value junction capacitance $C_j$ since at each half of an AC cycle one rectifier is operating in a reverse direction to develop the junction capacitance effect. Furthermore, another particularly desirable feature of circuit element 22 is that it exhibits an improved varistor action effective at high voltages so that the circuit element can also be considered as a combination capacitor $C_j$ and varistor $V_R$ (see FIG. 5).

This improved varistor effect is perhaps best understood with an examination of circuit elements of the type with which this invention is concerned as they were manufactured prior to this invention. Such prior elements, although exhibiting a junction capacitance, included metallic acceptor electrodes which were applied directly to the relatively high conductivity reduced titanate ceramic material and the varistor leakage in such a circuit element was excessively high at voltages above 3 volts. It has been observed that varistor action is controlled by volume resistivity and that an increase in volume resistivity can be achieved by pre-oxidizing the reduced titanate ceramic. For example, a sample of ceramic semiconductor material comprising 84.5% $BaTiO_3$, 15.0% strontium titanate ($SrTiO_3$) and 1.5% mixture of rare earth oxides soaked in a mixture of 10 grams of NaOH, or $Bi_2O_3$, in 100 cc. of a light vehicle (water or turpentine), drained and fired at 1800° F. for ½ hour will have its volume resistivity increased from approximately 10 ohm/cm. to approximately $10^5$ ohm/cm. When the acceptor junction paint, as described above, is applied and fired for ½ hour at 1700° F., a circuit element results having a junction capacitance of approximately 0.1 $\mu$f./cm.$^2$ with a negligible varistor leakage of more than 100,000 ohms at 25 volts. In this connection the use of acceptor paint containing $Bi_2O_3$ is particularly advantageous in that the bismuth ion diffuses into the junction area and contributes to the partial oxidation of the substrate adjacent the acceptor electrode to further increase volume resistivity and enhance high voltage varistor action. The increase in volume resistivity will of course be determined by the length of the soaking time, which determines the degree of penetration into the ceramic substrate, the firing temperature and the length of firing. For example, by extending the firing cycles by 1 hour for preoxidizing and 1 hour for the acceptor junctions the grading of the junction layer increases, i.e. it becomes thicker, more greatly oxidized and of higher resistance.

Circuit devices (rectifiers, back-to-back rectifier combinations which produce capacitor-varistor combinations) can be constructed in accordance with this invention for operation at higher voltages, are extremely miniature, of rugged construction, exhibit a large junction capacitance and a usable high voltage varistor characteristic which results in their having wider range of uses in moder electronic circuit applications. For example, circuit element 22 in exhibiting a combination high value capacitance $C_j$ and a varistor $V_R$ provides in one miniature, rugged, high voltage circuit element a circuit which is recognized as ideally suited for arc suppression when used in combination with electrical switching apparatus operating in the range of 200 volts AC and subjected to inductive voltage peaks.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. The method of making an electric circuit element comprising the steps of partially oxidizing an N-type reduced titanate semiconducting substrate by applying a liquid mixture containing a quantity of NaOH to the exterior surfaces of said substrate and, after predetermined permeation of said liquid mixture into said substrate firing said substrate at a predetermined temperature for a predetermined time sufficient to form areas therein having a volume resistivity that is relatively greater than would be available without said partial oxidation, and forming electrodes in contact with said areas.

2. The method of making an electric circuit element comprising the steps of partially oxidizing an N-type reduced titanate semiconducting substrate by exposing the surfaces of said substrate to a liquid mixture containing a quantity of $Bi_2O_3$ and, after said mixture has permeated said surfaces to a desired degree, removing said substrate from said exposure and firing said substrate at a predetermined temperature for a predetermined time sufficient to form areas therein having a volume resistivity that is relatively greater than would be available without said partial oxidation, and forming electrodes in contact with said areas.

3. The method of making an electric circuit element comprising the steps of partially oxidizing a reduced titanate substrate by soaking said substrate in a mixture containing a quantity of sodium hydroxide and after said mixture has permeated said substrate removing said substrate from said mixture and firing said substrate at a predetermined temperature for a predetermined time sufficient to form areas therein having a volume resistivity that is relatively greater than would be available without said partial oxidation, and forming acceptor diffused junction electrodes in contact with said areas.

4. The method of making an electric circuit element comprising the steps of soaking a reduced titanate substrate in a mixture comprising an oxidizing agent in a vehicle, after said mixture has permeated said substrate firing said substrate at a predetermined temperature for a predetermined time sufficient to form areas therein having a volume resistivity that is relatively greater than would be available without said partial oxidation, and forming acceptor diffused junction electrodes in contact with said areas.

5. The method of claim 4 wherein said mixture includes a quantity of NaOH as said oxidizing agent.

6. The method of claim 4 wherein said mixture includes a quantity of $Bi_2O_3$ as said oxidizing agent.

7. The method of claim 4 wherein said mixture includes quantities of NaOH and $Bi_2O_3$ as oxidizing agents.

8. The method of claim 7 wherein said acceptor diffused junction electrodes are formed by applying a conductive paint containing quantities of $Bi_2O_3$ and boron to said areas and firing.

9. In the method of making a rectifier on a semiconducting reduced titanate substrate the steps of partially oxidizing said substrate by soaking said substrate in a mixture containing an oxidizing agent for a length of time sufficient to permit said mixture to permeate said substrate and subsequently removing said substrate from said mixture and firing said substrate, and forming a donor diffused junction by applying an electrically conductive paint mixture containing a predetermined quantity of $Cb_2O_5$ to said partially oxidized substrate and firing at a predetermined temperature for a predetermined time.

10. The method of making a rectifier comprising the steps of partially oxidizing a reduced titanate substrate soaking said substrate in a mixture containing an oxidizing agent for a length of time sufficient to permit said mixture to permeate said substrate and subsequently firing said substrate, forming a donor diffused junction electrode by applying an electrically conductive paint mixture containing a predetermined quantity of $Cb_2O_5$ to said substrate, firing said substrate, and forming an acceptor diffused junction electrode on said substrate.

11. The method of claim 10 wherein said acceptor diffused junction electrode is formed by applying an electrically conductive paint containing quantities of $Bi_2O_3$ and boron to said substrate and firing.

12. The method of making a donor junction metallic electrode on an N-type reduced titanate semiconducting substrate comprising, the steps of soaking said substrate in a mixture containing an oxidizing agent for a length of time sufficient to permit said mixture to permeate said substrate and subsequently firing said substrate applying a quantity of $Ag_2O$ and $Cb_2O_5$ in a resinous vehicle onto said substrate, and firing said semiconductor with said mixture of $Ag_2O$ and $Cb_2O_5$ applied thereto to form a silver electrode in ohmic contact with a ceramic layer having a volume resistivity relatively greater than would be available without partial oxidation into which a donor impurity agent ($Cb_2O_5$) has diffused forming a diffused donor junction rectifying contact.

13. The method of claim 12 in which $BPO_4$ as an activator is added to said mixture to enhance the efficiency of said donor doping impurity agent.

14. The method of making an acceptor junction metallic electrode an N-type reduced titanate semiconductor comprising the steps of partially oxidizing said substrate by soaking said substrate in a mixture containing an oxidizing agent for a length time sufficient to permit said mixture to permeate said substrate and subsequently firing said substrate, applying a mixture of finely divided silver particles, $BiO_3$ and boron silicate alkali earth frit onto said substrate, and firing said semiconductor with said mixture applied thereto to form a conducting silver film in ohmic contact with a diffused acceptor doped area of the N-type, ceramic semiconductor having a volume resistivity relatively greater than would be available without partial oxidation.

15. The method of making a diode rectifier having high rectification efficiency and a large value of junction capacitance on an N-type reduced titanate semiconductor substrate comprising, the steps of soaking said substrate in a mixture containing an oxidizing agent for a length of time sufficient to permit said mixture to permeate said substrate and subsequently firing said substrate, applying a mixture of $Ag_2O$ and $Cb_2O_5$ in a resinous vehicle onto a reduced titanate, polycrystalline, alkaline earth, applying a mixture of finely divided silver particles, bismuth $BiO_3$ and boron silicate alkali earth frit onto said semiconductor, and firing said semiconductor with said mixtures applied thereto so that a diffused donor junction rectifying contact is formed with a silver electrode in ohmic contact with a ceramic layer onto which a donor impurity agent ($Cb_2O_5$) has been diffused and an acceptor junction is also formed having a conducting silver film in ohmic contact with a diffused acceptor doped area of said semiconductor.

16. The method of constructing a dual rectifier device to develop a useful value of junction capacitance having a varistor type leakage N-type reduced titanate semiconductor comprising, the steps of soaking said substrate in a mixture containing an oxidizing agent for a length of time sufficient to permit said mixture to permeate said substrate and subsequently firing said substrate applying a mixture of finely divided silver particles, $BiO_3$ and boron silicate alkaline earth frit to two relatively spaced areas on an N-type ceramic semiconductor, and firing said semiconductor with said mixtures applied thereto to form a pair of acceptor junction metallic electrodes having a conducting silver film in ohmic contact with a diffused acceptor doped area of said semiconductor.

17. The method of claim 16 wherein said oxidizing agent is NaOH.

18. The method of claim 16 wherein said oxidizing agent is $Bi_2O_3$.

References Cited

UNITED STATES PATENTS

| | | | |
|---|---|---|---|
| 2,695,380 | 11/1954 | Mayer ___________ | 117—200 X |
| 2,877,147 | 3/1954 | Thurmond. | |
| 2,940,941 | 6/1960 | Dalton __________ | 117—200 X |
| 3,179,576 | 4/1965 | Huber __________ | 117—200 X |
| 3,259,558 | 7/1966 | Hiroshi __________ | 117—200 X |

OTHER REFERENCES

"Titanium Dioxide Rectifiers," by R. G. Brenridge and W. R. Brenridge and W. R. Holser, pp. 65–72, Journal of Research of National Bureau of Standards, vol. 49, No. 2, August 1952, Research Paper 2344, copy 117-200.

HYLAND BIZOT, *Primary Examiner.*